(12) United States Patent
Lai et al.

(10) Patent No.: US 10,862,319 B2
(45) Date of Patent: Dec. 8, 2020

(54) BATTERY MODULE WITH ABNORMALITY DETECTION FUNCTION AND POWER STORAGE APPARATUS AND METHOD OF OPERATING THE SAME

(71) Applicant: DELTA ELECTRONICS, INC., Taoyuan (TW)

(72) Inventors: Yuan-Fang Lai, Taoyuan (TW); Ying-Sung Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 55 days.

(21) Appl. No.: 16/020,336

(22) Filed: Jun. 27, 2018

(65) Prior Publication Data

US 2019/0157880 A1 May 23, 2019

(30) Foreign Application Priority Data

Nov. 23, 2017 (CN) .......................... 2017 1 1181314

(51) Int. Cl.
*H02J 7/00* (2006.01)
*H01M 10/48* (2006.01)

(52) U.S. Cl.
CPC ........... *H02J 7/0026* (2013.01); *H01M 10/48* (2013.01); *H02J 7/0021* (2013.01); *H02J 7/0068* (2013.01)

(58) Field of Classification Search
USPC .................................................. 320/134–136
See application file for complete search history.

(56) References Cited

U.S. PATENT DOCUMENTS

| 4,041,451 | A | * | 8/1977 | Zarkadas | C09K 5/08 340/458 |
|---|---|---|---|---|---|
| 5,963,019 | A | * | 10/1999 | Cheon | H02H 7/18 320/150 |
| 6,331,763 | B1 | * | 12/2001 | Thomas | H02H 9/042 320/136 |
| 8,890,483 | B2 | * | 11/2014 | Nakatsuji | H01M 2/34 320/134 |
| 2004/0257191 | A1 | * | 12/2004 | Muller | H01H 85/32 337/159 |
| 2006/0017540 | A1 | * | 1/2006 | Smith | H01H 85/32 337/242 |
| 2009/0112496 | A1 | * | 4/2009 | Suzuki | H02J 7/0022 702/63 |
| 2010/0072950 | A1 | * | 3/2010 | Tatebayashi | H02J 7/0031 320/134 |

(Continued)

*Primary Examiner* — Samuel Berhanu
(74) *Attorney, Agent, or Firm* — Muncy, Geissler, Olds & Lowe, P.C.

(57) ABSTRACT

A power storage apparatus includes at least one battery module and a charging module. Each battery module includes a battery assembly, a protection unit, and a detection unit. The protection unit is connected in series to the battery assembly. The detection unit is connected in parallel to the protection unit, and the detection unit has an indication element. The charging module is connected in parallel to the at least one battery module to charge the battery assembly. When a voltage difference value of the protection unit is greater than a voltage setting value, the voltage difference value enables the indication element. Accordingly, simple circuit components installed in each battery module are used to individually protect the battery module and detect an abnormal operation of the battery module.

18 Claims, 7 Drawing Sheets

(56) References Cited

U.S. PATENT DOCUMENTS

| | | | |
|---|---|---|---|
| 2011/0175699 A1* | 7/2011 | Huss | H01H 85/32 337/143 |
| 2014/0293666 A1* | 10/2014 | Merz | H01H 9/42 363/50 |
| 2015/0035356 A1* | 2/2015 | Sakata | H02J 7/16 307/9.1 |

* cited by examiner

BATTERY MODULE WITH ABNORMALITY DETECTION FUNCTION AND POWER STORAGE APPARATUS AND METHOD OF OPERATING THE SAME

BACKGROUND

Technical Field

The present invention relates to a battery module and a power storage apparatus and a method of operating the same, and more particularly to a battery module with an abnormality detection function and a power storage apparatus and a method of operating the same.

Description of Related Art

An uninterruptible power supply (UPS) is used to uninterruptedly supply the required power to maintain an electrical device, such as a computer device working in a normal condition. For example, the UPS uninterruptedly supplies the required power to the critical commercial devices, such as the server and switch or precision devices to prevent the loss of important data stored in the critical commercial devices or the precision devices from the interrupted power supply.

The used power storage device inside the UPS is commonly the rechargeable battery. Also, the fuse is cooperated with the rechargeable battery to protect the rechargeable battery by the failure isolation. In the prior art, the fuses are usually used to protect a plurality of battery modules as a whole according a total current of the battery modules as a whole. However, the existing protection fails to individually provide protection and detect abnormal operation for single battery module. Once any one of the battery modules is abnormal, however, it fails to accurately and quickly determine which battery module is abnormal, thereby affecting the efficiency of excluding the abnormal condition. Moreover, it would increase circuit design complexity and circuit costs as well as the possibility of the battery leakage if additional detection circuits and/or protection circuits are installed for individual and single detection and protection.

SUMMARY

An objective of the present invention is to provide a battery module with an abnormality detection function to solve the above-mentioned problems of failing to individually provide protection and detect abnormal operation for single battery module.

In order to achieve the above-mentioned objective, the battery module with the abnormality detection function includes a body, a battery assembly, a protection unit, and a detection unit. The battery assembly is disposed inside the body, and the battery assembly has a plurality of battery units electrically connected to each other. The protection unit is disposed inside the body and connected in series to the battery assembly, and the protection unit has a first end and a second end. The detection unit is disposed inside the body and connected in parallel between the first end and the second end of the protection unit. The detection unit includes an indication element. The indication element is to be enabled by a voltage difference value between the first end and the second end when the voltage difference value is greater than a voltage setting value.

In one embodiment, the detection unit further includes a current-limiting resistor and a diode. The current-limiting resistor is connected in series to the indication element. The diode is forward connected in series to the current-limiting resistor or the indication element.

In one embodiment, the detection unit further includes a voltage-limiting resistor. The voltage-limiting resistor is connected in parallel to the indication element.

In one embodiment, a resistance value of the voltage-limiting resistor is greater than a resistance value of the current-limiting resistor.

In one embodiment, the protection unit is a fuse.

In one embodiment, the indication element is a light indication element or a sound indication element.

In one embodiment, the first end and the second end of the protection unit are coupled to the body to form at least two dry contacts, and the at least two dry contacts are connected to an external monitoring apparatus; concerned information of the voltage difference value is transmitted to the external monitoring apparatus so that the external monitoring apparatus is configured to monitor an operation status of the battery module according to the concerned information of the voltage difference value.

In one embodiment, the battery module with the abnormality detection function further includes a connection interface. The connection interface is disposed inside the body and connected to two ends of a serial-connected structure formed by the battery module and the protection unit, and the connection interface provides a positive terminal and a negative terminal.

Accordingly, the battery module with the abnormality detection function is implemented to individually provide protection and detect abnormal operation for single battery module by using simple circuit components installed in each battery module.

Another objective of the present invention is to provide a power storage apparatus to solve the above-mentioned problems of failing to individually provide protection and detect abnormal operation for single battery module.

In order to achieve the above-mentioned objective, the power storage apparatus includes at least one battery module with an abnormality detection function and a charging module. Each battery module includes a body, a battery assembly, a protection unit, and a detection unit. The battery assembly is disposed inside the body, and the battery assembly has a plurality of battery units electrically connected to each other. The protection unit is disposed inside the body and connected in series to the battery assembly, and the protection unit has a first end and a second end. The detection unit is disposed inside the body and connected in parallel between the first end and the second end of the protection unit, and the detection unit includes an indication element. The indication element is to be enabled by a voltage difference value between the first end and the second end when the voltage difference value is greater than a voltage setting value. The charging module is connected in parallel to the at least one battery module and charges the at least one battery assembly of the at least one battery module.

In one embodiment, the number of the battery module is one, and the one battery module is connected in parallel to the charging module. The indication element is not enabled if the protection unit is not disconnected when the charging module charges the battery assembly; the indication element is enabled if the protection unit is disconnected so that the voltage difference value of the protection unit is greater than the voltage setting value when the charging module charges the battery assembly.

In one embodiment, the number of the battery module is two or more than two, and a serial-connected branch formed by the two or more than two battery modules is connected in parallel to the charging module. The indication elements are not enabled if the two or more than two protection units are not disconnected when the charging module charges the two or more than two battery assemblies on the serial-connected branch; the indication element of at least one disconnected protection unit is enabled if the at least one protection unit is disconnected so that the voltage difference value of the at least one disconnected protection unit is greater than the voltage difference value when the charging module charges the two or more than two battery assemblies on the serial-connected branch.

In one embodiment, the number of the battery module is four or more than four, and at least two serial-connected branches formed by the four or more than four battery modules are connected in parallel to the charging module. The indication elements are not enabled if the four or more than four protection units are not disconnected when the charging module charges the four or more than four battery assemblies on the at least two serial-connected branches; the indication element of at least one disconnected protection unit is enabled if the at least one protection unit is disconnected so that the voltage difference value of the at least one disconnected protection unit is greater than the voltage difference value when the charging module charges the four or more than four battery assemblies on the at least two serial-connected branches; the indication element of at least one disconnected protection unit is not enabled if the at least one protection unit is disconnected so that the voltage difference value of the at least one disconnected protection unit is less than or equal to the voltage difference value after the charging module completes charging the four or more than four battery assemblies on the at least two serial-connected branches; the indication element of at least one disconnected protection unit is enabled if the at least one protection unit is disconnected so that the voltage difference value of the at least one disconnected protection unit is greater than the voltage difference value after the charging module completes charging the four or more than four battery assemblies on the at least two serial-connected branches.

In one embodiment, the charging module is an AC-to-DC converter.

Accordingly, the power storage apparatus is implemented to individually provide protection and detect abnormal operation for single battery module by using simple circuit components installed in each battery module.

Another further objective of the present invention is to provide a method of operating a battery module with an abnormality detection function to solve the above-mentioned problems of failing to individually provide protection and detect abnormal operation for single battery module.

In order to achieve the above-mentioned objective, the method of operating the battery module with an abnormality detection function includes steps of: (a) providing a battery module, wherein the battery module comprises a battery assembly, a protection unit, and a detection unit; (b) providing a first current path and a second current path; wherein the protection unit and the battery assembly are located on the first current path, and the detection unit and the battery assembly are located on the second current path; and (c) flowing an operation current through the second current path when the protection unit is disconnected; flowing the operation current through the first current path when the protection is not disconnected.

In one embodiment, the operation current flows through the second current path when a voltage value across two ends of the protection unit is greater than a voltage setting value.

In one embodiment, the detection unit includes an indication element. The indication element is enabled by the operation current when the voltage value across two ends of the protection unit is greater than the voltage setting value.

In one embodiment, the detection unit further includes a current-limiting resistor and a diode. The current-limiting resistor is connected in series to the indication element. The diode is forward connected in series to the current-limiting resistor or the indication element.

In one embodiment, the detection unit further includes a voltage-limiting resistor. The voltage-limiting resistor is connected in parallel to the indication element.

In one embodiment, the protection unit is a fuse.

In one embodiment, the indication element is a light indication element or a sound indication element.

Accordingly, the method of operating a battery module with an abnormality detection function is implemented to individually provide protection and detect abnormal operation for single battery module by using simple circuit components installed in each battery module on different current paths.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Reference will now be made to the drawing figures to describe the present invention in detail. It will be understood that the drawing figures and exemplified embodiments of present invention are not limited to the details thereof.

Figure 1A:
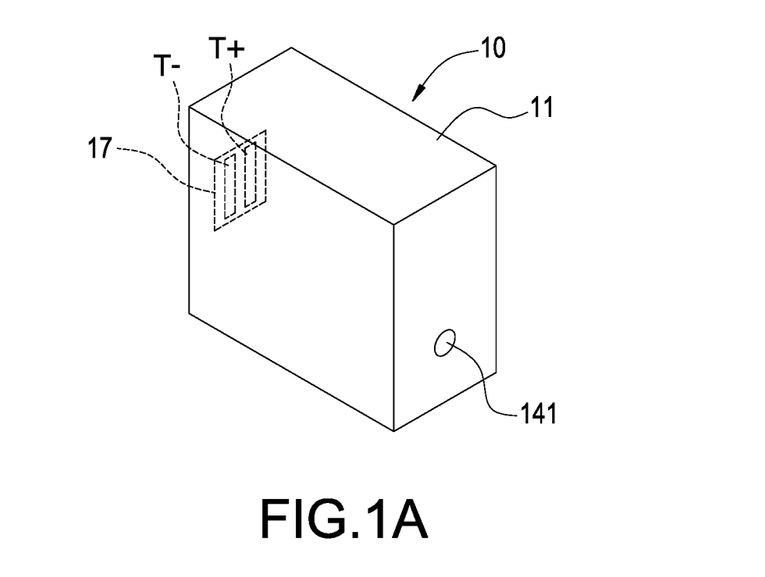
FIG. 1A is a perspective view of a battery module with an abnormality detection function according to the present invention.
Figure 1B:
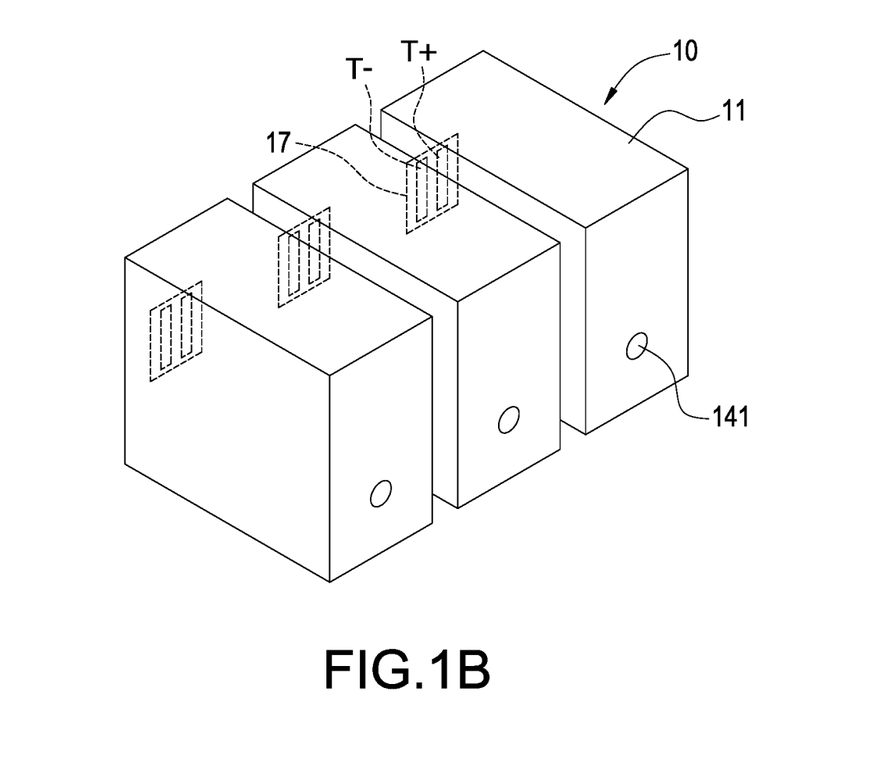
FIG. 1B is a perspective assembled view of the battery modules in FIG. 1A.

Please refer to FIG. 1A and FIG. 1B, which show a perspective view of a battery module with an abnormality detection function and a perspective assembled view of the battery modules according to the present invention, respectively. The battery module with the abnormality detection function (hereinafter referred to as "battery module 10") includes a body 11, and the body 11 is used to contain electrical elements of the battery module 10. The details of the battery module 10 will be described as follows.

Figure 2:
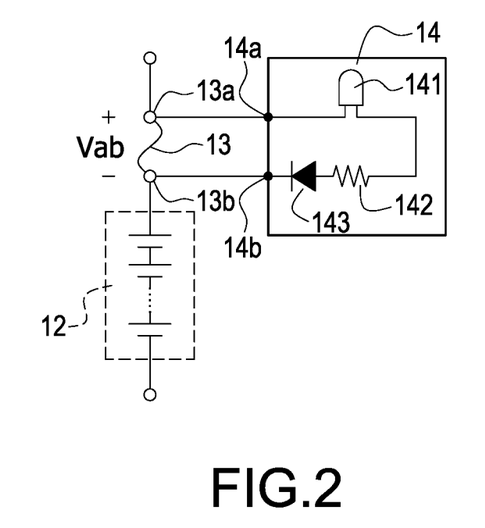
FIG. 2 is a circuit diagram of the battery module according to a first embodiment of the present invention.

Please refer to FIG. 2, which shows a circuit diagram of the battery module according to a first embodiment of the present invention. Also refer to FIG. 1A, the battery module 10 further includes a battery assembly 12, a protection unit 13, and a detection unit 14. The battery assembly 12 is disposed inside the body 11, and the battery assembly 12 has a plurality of battery units electrically connected to each other. The battery assembly 12 includes, for example but not limited to, seven rechargeable batteries which are connected in series to each other and disposed inside the body 11. Also, each rechargeable battery may individually provide 12-volt DC voltage and therefore the battery assembly 12 may provide 84-volt DC voltage as an uninterruptible power source.

The protection unit 13 is disposed inside the body 11 and connected in series to the battery assembly 12. As shown in FIG. 2, the protection unit 13 has a first end 13a and a second end 13b, and the second end 13b is connected in series to a positive side of the battery assembly 12 to form a serial-connected structure. In another embodiment, the first end 13a may be connected in series to a negative side of the battery assembly 12 to also form another serial-connected structure. In this embodiment, the protection unit 13 is a fuse. When a current flowing through the serial-connected structure formed by the battery assembly 12 and the protection unit 13 is excessive, the fuse blows due to the heat generated by the excessive current, and therefore the serial-connected structure is disconnected to protect the battery module 10 from damage. In another embodiment, however, the protection unit 13 is not limited to the fuse, namely other electrical components capable of providing over-current and/or over-voltage protections can be used as the protection unit 13.

The detection unit 14 is disposed inside the body 11 and connected in parallel to the protection unit 13. As shown in FIG. 2, the detection unit 14 has a first connection end 14a and a second connection end 14b, and the first connection end 14a is connected to the first end 13a of the protection unit 13 and the second connection end 14b is connected to the second end 13b of the protection unit 13. In one example, the detection unit 14 has only an indication element 141, namely two ends of the indication element 141 are respectively the first connection end 14a and the second connection end 14b, and the two ends of the indication element 141 are directly connected in parallel to the first end 13a and the second end 13b of the protection unit 13, respectively. In one embodiment, the indication element 141 may be a light indication element or a sound indication element. For example, the light indication element may be, but not limited to, a light-emitting diode (LED), a seven-segment display, or a liquid crystal display (LCD); the sound indication element may be, but not limited to, a buzzer or a speaker. In another embodiment, however, the indication element 141 is not limited to the above-mentioned devices, namely other electrical devices capable of indicating or rendering the operation status of the battery module 10 can be used as the indication element 141.

In one example, the detection unit 14 shown in FIG. 2 further has a current-limiting resistor 142 and a diode 143 besides the indication element 141. The current-limiting resistor 142 is connected in series to the indication element 141 for limiting a current flowing through the indication element 141, thereby protecting the indication element 141 from the excessive current. In another embodiment, a Zener diode is provided to connect in parallel to a serial-connected branch formed by the current-limiting resistor 142 and the indication element 141, and therefore to further limit the brightness of the indication element 141. The diode 143 is forward connected in series to the current-limiting resistor 142 or the indication element 141 for protecting the detection unit 14 from a reverse voltage, namely an opposite-polarity voltage applied to the detection unit 14. In another example, the absence of the diode 143 in the detection unit 14 makes the detection unit 14 be able to provide the abnormality detection function when the battery assembly 12 discharges.

When a voltage difference value Vab produced between the first end 13a and the second end 13b of the protection unit 13 is greater than a voltage setting value, the voltage difference value Vab is sufficient to enable the indication element 141. For example, it is assumed that the voltage setting value is, but not limited to, 5 volts. When a current flowing through the protection unit 13 (namely the fuse) is normal, namely the current flowing through the protection unit 13 is less than a current which is capable of blowing the fuse, the fuse does not blow. At this condition, the voltage difference value Vab is zero volt so that the voltage difference value Vab is less than the voltage setting value (5 volts) and insufficient to enable the indication element 141. Take the LED for example, the voltage difference value Vab is insufficient to enable the LED to light up. In other words, the LED does not light up when the current flowing through the fuse is normal. Accordingly, when a system operator or a system maintainer sees that the LEDs are extinguished, he or she can realize that the operation status of the battery module 10 is normal.

In particular, when the operation status of the battery module 10 is normal, the detection unit 14 is idle. At this condition, there is almost no power consumption generated from the indication element 141, the current-limiting resistor 142, and the diode 143, and thereby achieving the low power consumption. As mentioned above, the indication element 14 may be the light-emitting diode (LED), the seven-segment display, the liquid crystal display (LCD), the buzzer, or the speaker as long as the voltage setting values Vset are appropriately predetermined for the above-mentioned components and devices to make them indicate or render the operation status of the battery module 10 in the light manner or sound manner. In addition, the indication element 141 may be partially or completely exposed outside the body 11 so that the system operator or the system maintainer easily realizes the abnormal operation status of the system through the light indication or the sound indication of the indication element 141.

On the contrary, when the current flowing through the fuse is excessive, namely the current flowing through the protection unit 13 is greater than a current which is capable of blowing the fuse, the fuse blows. At this condition, the voltage difference value Vab is up to six volts so that the voltage difference value Vab is greater than the voltage setting value and sufficient to enable the indication element 141. Take the LED for example, the voltage difference value Vab is sufficient to enable the LED to light up. In other words, the LED lights up when the current flowing through the fuse is excessive. Accordingly, when the system operator or the system maintainer sees that the LEDs light or blink, he or she can realize that the operation status of the battery module 10 is abnormal, and therefore the battery module 10 shall be replaced or repaired.

Figure 3:
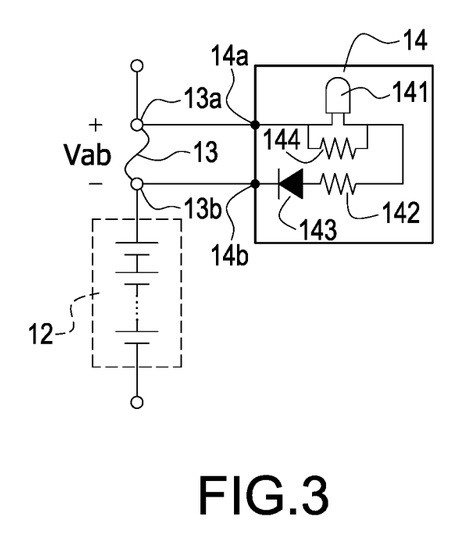
FIG. 3 is a circuit diagram of the battery module according to a second embodiment of the present invention.

Please refer to FIG. 3, which is a circuit diagram of the battery module according to a second embodiment of the present invention. In comparison with the first embodiment shown in FIG. 2, the detection unit 14 of the battery module 10 shown in FIG. 14 further includes a voltage-limiting resistor 144. The voltage-limiting resistor 144 is connected in parallel to the indication element 141. In one embodiment, a resistance value of the voltage-limiting resistor 144 is greater than a resistance value of the current-limiting resistor 142. In practical application, the resistance value of the voltage-limiting resistor 144 is designed to be much greater than the resistance value of the current-limiting resistor 142. For example, the resistance value of the current-limiting resistor 142 may be designed to be, but not limited to, $10^3$ ohms and the resistance value of the voltage-limiting resistor 144 may be designed to be, but not limited to, $10^6$ ohms, but not limited. In other words, the resistance value of the voltage-limiting resistor 144 may be designed to be more than a thousand times the resistance value of the current-limiting resistor 142.

When the protection unit 13 is disconnected and a voltage value at the second end 13b is greater than a voltage value at the first end 13a, the voltage difference value Vab is minus. At this condition, the diode 143 and the LED, namely the indication element 141 are in reverse biased, and therefore the voltage-limiting resistor 144 is used to significantly reduce a voltage value across the indication element 141, thereby protecting the indication element 141 from the reverse-biased voltage. Also, since the indication element 141 is connected in parallel to the voltage-limiting resistor 144 with a high impedance, the indication element 141 can still normally operate at a normal current without being affected by the voltage-limiting resistor 144 when the indication element 141 is in forward biased.

Figure 4:
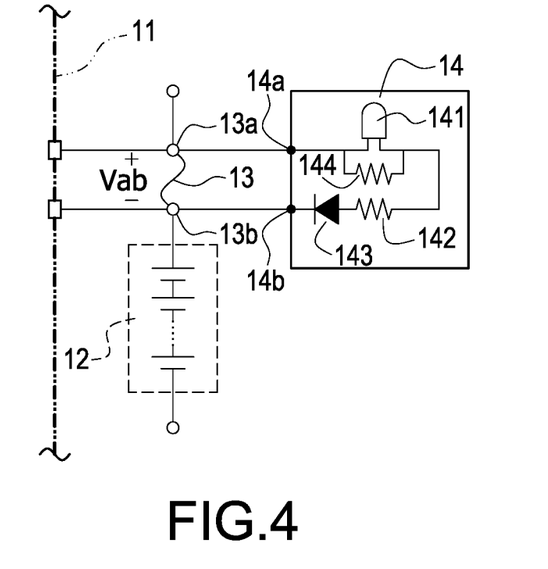
FIG. 4 is a circuit diagram of the battery module according to a third embodiment of the present invention.

Please refer to FIG. 4, which is a circuit diagram of the battery module according to a third embodiment of the present invention. Besides the light indication manner or the sound indication manner, the concerned information of the voltage difference value Vab of the protection unit 13 acquired by the battery module 10 may be transmitted to an external monitoring apparatus in a remote location. Therefore, the system operator or the system maintainer can realize the operation status of the battery module 10 according to the monitored or recorded information of the voltage difference value Vab and/or perform the required replacement or repair.

Specifically, as shown in FIG. 4, two ends of the protection unit 13, namely the first end 13a and the second end 13b, are electrically connected or optically coupled to the body 11 of the battery module 10 to form dry contacts or the like of it. Also, the concerned information of the voltage difference value Vab of the protection unit 13 acquired by the battery modules 10 may be transmitted to an external monitoring apparatus, such as an UPS (uninterruptible power supply) or an EMS (environmental management system) through the dry contacts. Accordingly, the system operator or the system maintainer can monitor or record in a remote location to increase the efficiency of managing the uninterruptible power supply.

Also refer to FIG. 1A, the battery module 10 further includes a connection interface 17. The connection interface 17 is inside the body 11 or on one side of the body 11, and the connection interface 17 provides a positive terminal T+ and a negative terminal T− for connecting to two ends of a serial-connected structure formed by the battery assembly 12 and the protection unit 13. More specifically, the connection interface 17 has two electrical interfaces, wherein one is a positive electrical interface providing the positive terminal T+ and the other is a negative electrical interface providing the negative terminal T−. The two electrical interfaces are used for connections of multiple battery modules in serial and/or parallel manners. When the positive terminals T+ of the connection interfaces 17 are connected to each other and the negative terminals T− of the negative terminal T− of the connection interfaces 17 are connected to each other, the battery modules 10 are connected in parallel to each other. Alternatively, when the positive terminal T+ of one connection interface is correspondingly connected to the negative terminal T− of another connection interface, the battery modules 10 are connected in series.

The battery module with the abnormality detection function is applied to an uninterruptible power supply (UPS). The power storage apparatus 40 is installed inside the UPS cabinet 100 to uninterruptedly supply power. When the main power source interrupts or fails, the power storage apparatus 40 can immediately supply the required power to the load, such the computer device to work in a normal condition.

Figure 5:
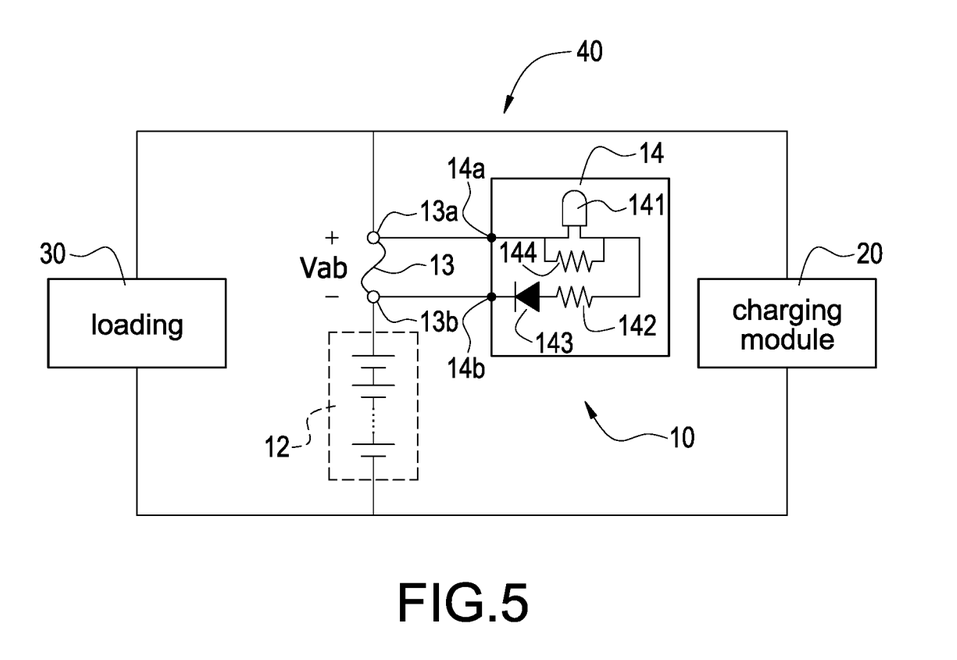
FIG. 5 is a circuit block diagram of a power storage apparatus according to a first embodiment of the present invention.

Please refer to FIG. 5, which is a circuit block diagram of a power storage apparatus according to a first embodiment of the present invention. The power storage apparatus 40 includes at least one battery module with an abnormality detection function (hereinafter referred to as "battery module 10") and a charging module 20, and the power storage apparatus 40 uninterruptedly supplies power to a loading 30, for example but not limited to, a DC-to-AC inverter or a DC-to-DC converter.

As mentioned above, each of the battery modules 10 has a body 11, and further includes a battery assembly 12, a protection unit 13, and a detection unit 14. The detection unit 14 includes an indication element 141, and the indication element 14 is used to indicate or render an operation status, and particularly to an abnormal status of the battery module 10. Since the battery module 10 has disclosed above, the detail descriptions of the units of the battery module 10 are omitted here for conciseness.

The charging module 20 is connected in parallel to the at least one battery module 10 and the loading 30 for charging the at least one battery module 10. Also, the electricity power stored in the at least one battery module 10 is provided for supplying the loading 30 when the main power source interrupts or fails.

In one embodiment, the number of the at least one battery module 10 is one, and the one battery module 10 is connected in parallel to the charging module 20. When the charging module 20 charges the battery assembly 12 of the battery module 10, the indication element 141 of the battery module 10 is not enabled if the protection unit 13 of the battery module 10 is not disconnected, namely the protection unit 13 is normally conductive. At this condition, it means that no excessive abnormal charging current is produced to make the protection unit 13 disconnect, for example make the fuse blow, and the voltage difference value Vab between the first end 13a and the second end 13b is zero which is less than the voltage setting value Vset (5 volts), and therefore the voltage difference value Vab is insufficient to drive the indication element 141 (such as the LED) to light up. Accordingly, when the system operator or the system maintainer sees that the LEDs are extinguished, he or she can realize that the operation status of the battery module 10 is normal.

On the contrary, when the charging module 20 charges the battery assembly 12 of the battery module 10, the indication element 141 of the battery module 10 is enabled if the protection unit 13 of the battery module 10 is disconnected. At this condition, the voltage difference value Vab between the first end 13a and the second end 13b is greater than the voltage setting value Vset, and therefore the voltage difference value Vab is sufficient to enable the LED to light up. Accordingly, when the system operator or the system maintainer sees that the LEDs light or blink, he or she can realize that the operation status of the battery module 10 is abnormal, and therefore the battery module 10 shall be replaced or repaired.

Figure 6:
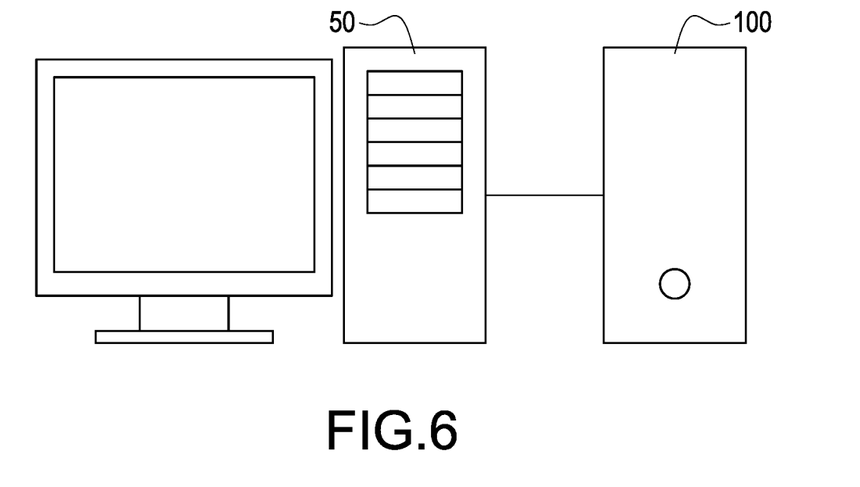
FIG. 6 is a schematic view of applying an UPS cabinet to an external monitoring apparatus according to the present invention.

Please refer to FIG. 6, which is a schematic view of applying an UPS cabinet to an external monitoring apparatus according to the present invention. As mentioned above, the power storage apparatus 40 is installed inside the uninterruptible power supply (UPS) cabinet 100. The power storage apparatus 40 may be connected to an external monitoring apparatus 50 in a wired manner. More specifically, the power storage apparatus 40 may provide the concerned information of the voltage difference values Vab of the protection units 13 acquired by the battery modules 10 to the external monitoring apparatus 50 through the dry contacts and the physical wires. Therefore, the concerned information of the voltage difference value Vab of the protection unit 13 acquired by the battery modules 10 may be transmitted to the external monitoring apparatus 50 through a wired manner and the concerned information of the voltage difference value Vab is rendered on the external monitoring apparatus 50. Accordingly, the system operator or the system maintainer can realize the operation statuses of the battery module 10 according to the concerned information of the voltage difference value Vab rendered on the external monitoring apparatus 50 and/or performs the required replacement or repair.

Figure 7:
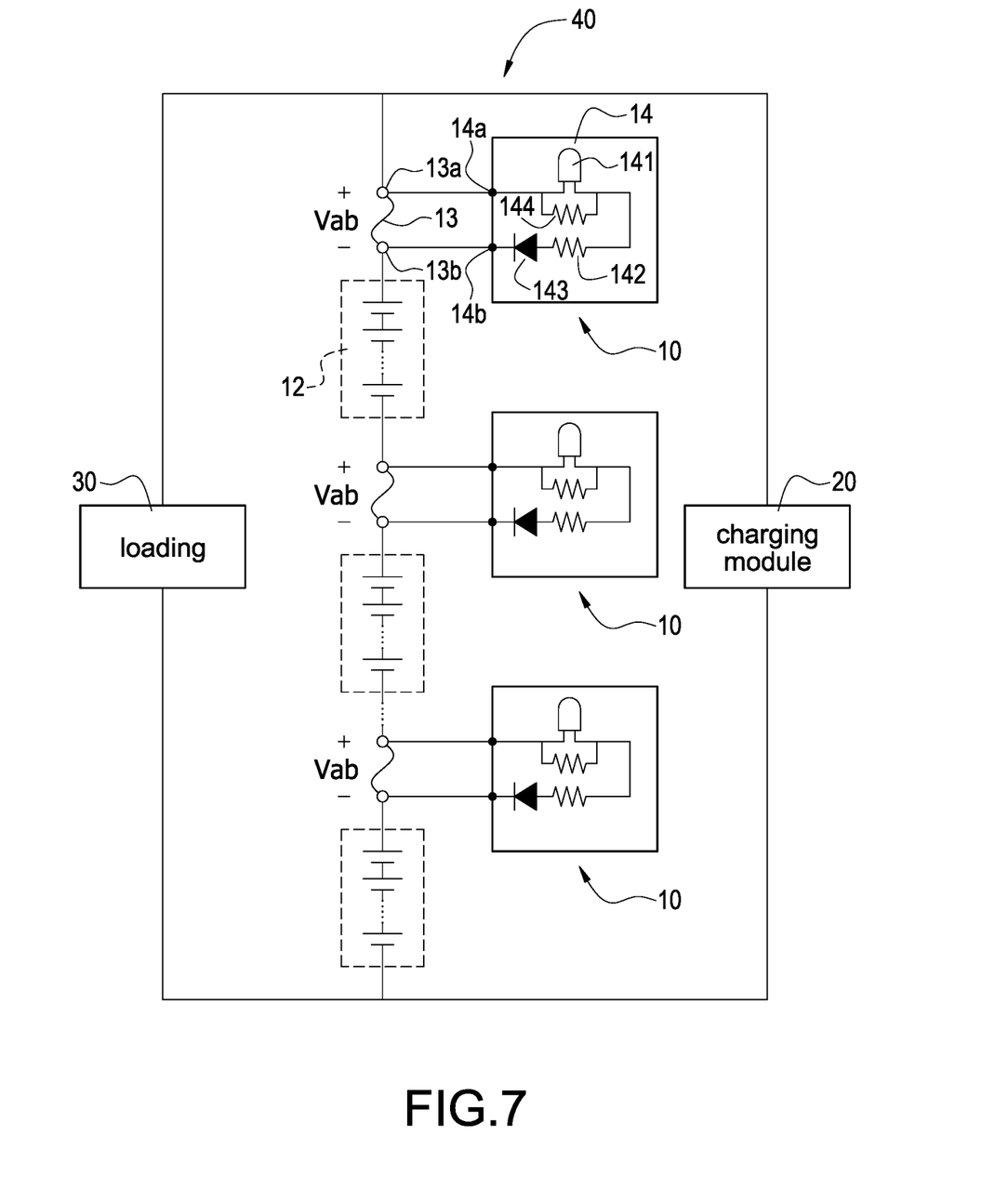
FIG. 7 is a circuit block diagram of the power storage apparatus according to a second embodiment of the present invention.

Please refer to FIG. 7, which is a circuit block diagram of the power storage apparatus according to a second embodiment of the present invention. The major difference between the second embodiment shown in FIG. 7 and the first embodiment shown in FIG. 5 is that the number of the at least one battery module 10 of the former is two or more than two. For example, as shown in FIG. 7, the more than two battery modules 10 are connected to form a serial-connected branch, and the serial-connected branch is connected in parallel to the charging module 20. When the charging module 20 charges the more than two battery assemblies 12 on the serial-connected branch, the more than two indication elements 141 of the battery modules 10 are not enabled if the more than two protection units 13 of the battery modules 10 are not disconnected (normally conductive). At this condition, no excessive abnormal charging current is produced to make any one of the more than two protection units 13 blow during charging. Therefore, the voltage difference value Vab of each protection unit 13 is zero volt, and the voltage difference value Vab is less than the voltage setting value (5 volts) and insufficient to enable the indication element 141. Accordingly, when the system operator or the system maintainer sees that the LEDs are extinguished, he or she can realize that the operation status of the battery module 10 is normal.

On the contrary, when the charging module 20 charges the more than two battery assemblies 12 on the serial-connected branch, the indication element 141 corresponding to the disconnected protection unit 13 is driven by the voltage difference value Vab if any one of the more than two protection units 13 of the battery modules 10 is disconnected and the voltage difference value Vab of the disconnected protection unit 13 is greater than the voltage setting value Vset. Accordingly, when the system operator or the system maintainer sees that the LEDs light or blink, he or she can realize that the operation status of the battery module 10 is abnormal, and therefore the battery module 10 shall be replaced or repaired.

In the present invention, the worst case scenario for the disconnection of all protection units 13 is considered. In other words, even though all protection units 13 of the more than two battery modules 10 are disconnected, each voltage difference value Vab of each protection unit 13 is still greater than the voltage setting value Vset, and therefore each indication element 141 can be driven to light up by the voltage difference value Vab.

For example, it is assumed that five battery modules 10 are connected on the serial-connected branch with no impedance, and a total voltage of each battery assembly 12 is 12 volts and the voltage setting value Vset is 5 volts. In response to the normal detection function of the power storage apparatus 40 under the consideration of the worst case scenario, a charging voltage provided by the charging module 20 shall be greater than or equal to 85 volts, which is equal to a sum of a total battery voltage (60 volts=12 volts×5) and a voltage (25 volts=5 volts×5) capable of lighting up all indication elements 141. Alternatively, the voltage setting value Vset may be reduced to correspondingly reduce the charging voltage besides providing the sufficient charging voltage of the charging module 20 as above-mentioned 85 volts. For example, if the voltage setting value Vset is reduced from 5 volts to 4 volts, the charging voltage may be designed to reduce from 85 volts to 80 volts, which is equal to a sum of a total battery voltage (60 volts=12 volts×5) and a voltage (20 volts=4 volts×5) capable of lighting up all indication elements 141. Accordingly, the voltage difference value across the two ends of the serial-connected branch is sufficient to drive the corresponding number of the indication elements 141 to light or blink, thereby accurately indicating or rendering the operation status, and particularly to the abnormal status of the battery module 10 for the system operator or the system maintainer. The above-mentioned examples are only for the description of the present invention and it will be understood that the present invention is not limited to the details thereof.

Figure 8:
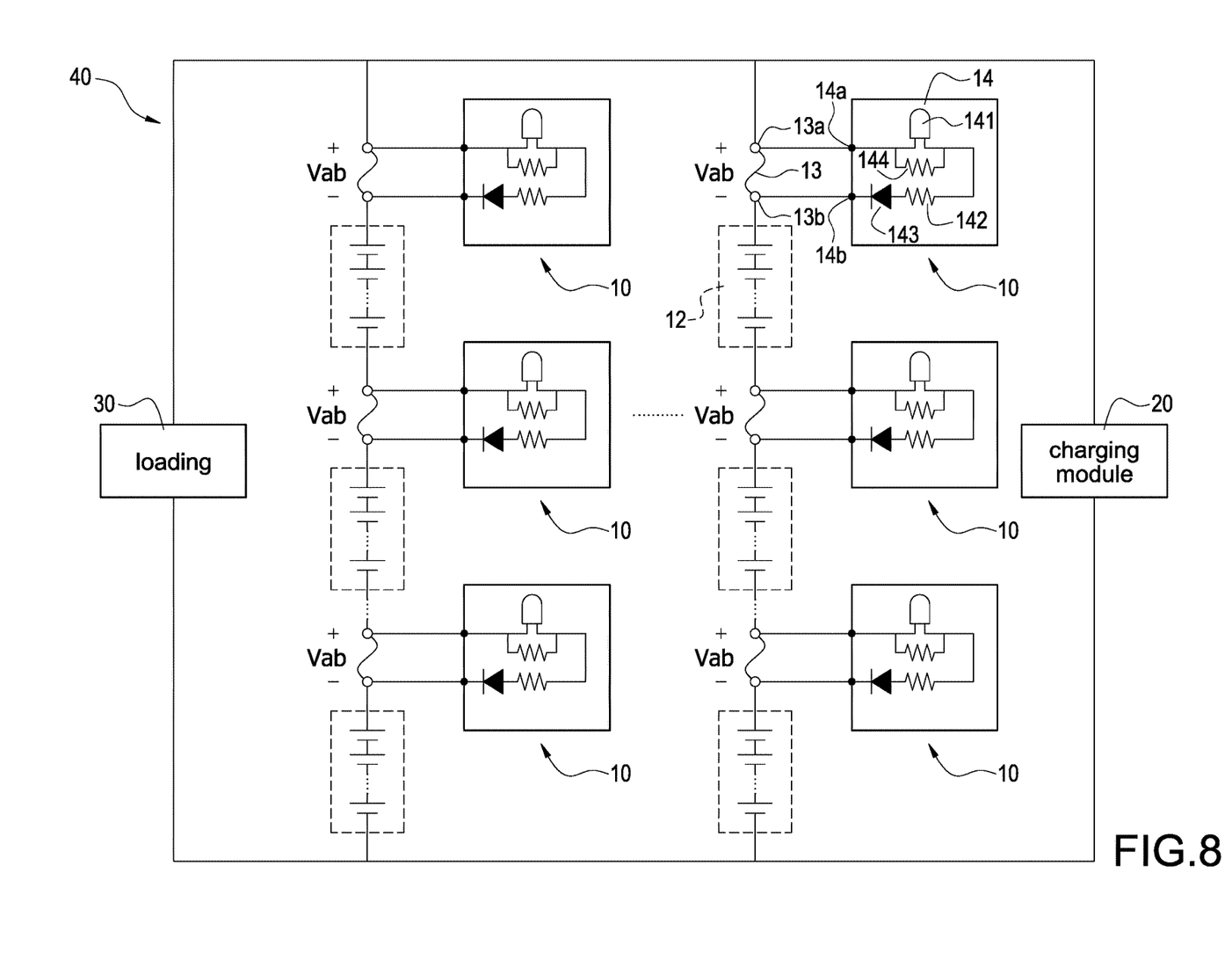
FIG. 8 is a circuit block diagram of the power storage apparatus according to a third embodiment of the present invention.

Please refer to FIG. 8, which is a circuit block diagram of the power storage apparatus according to a third embodiment of the present invention. The major difference between the third embodiment shown in FIG. 8 and the second embodiment shown in FIG. 7 is that the number of the serial-connected branch of the former is two or more than two. As shown in FIG. 8, the two or more than two serial-connected branches are connected in parallel to the charging module 20. When the charging module 20 charges the more than four battery assemblies 12 on the serial-connected branches, the more than four indication elements 141 of the battery modules 10 are not enabled if the more than four protection units 13 of the battery modules 10 are not disconnected (normally conductive). At this condition, no excessive abnormal charging current is produced to make any one of the more than four protection units 13 blow during charging. Therefore, the voltage difference value Vab of each protection unit 13 is zero volt, and the voltage difference value Vab is less than the voltage setting value (5 volts) and insufficient to enable the indication element 141. At this condition, the voltage difference value Vab across the first end 13a and the second end 13b of each protection unit 13 is zero volt so that the voltage difference value Vab is less than the voltage setting value (5 volts) and insufficient to enable the indication element 141. Take the LED for example, the voltage difference value Vab is insufficient to enable the LED to light up. Accordingly, when the system operator or the system maintainer sees that the LEDs are extinguished, he or she can realize that the operation statuses of the four or more than four battery modules 10 are normal.

On the contrary, when the charging module 20 charges the more than four battery assemblies 12 on the serial-connected branches, the indication element 141 corresponding to the disconnected protection unit 13 is driven by the voltage difference value Vab if any one of the more than four protection units 13 of the battery modules 10 is disconnected and the voltage difference value Vab of the disconnected protection unit 13 is greater than the voltage setting value Vset. Accordingly, when the system operator or the system maintainer sees that the LEDs light or blink, he or she can realize that the operation status of the battery module 10 is abnormal, and therefore the battery module 10 shall be replaced or repaired.

Similarly, the worst case scenario for the disconnection of all protection units 13 is considered in the third embodiment shown in FIG. 8. By designs of the charging voltage provided by the charging module 20 and the voltage setting value Vset, the voltage difference value across the two ends of each serial-connected branch is sufficient to drive the corresponding number of the indication elements 141 to light or blink, thereby accurately indicating or rendering the operation status, and particularly to the abnormal status of the battery module 10 for the system operator or the system maintainer.

Moreover, after the charging module 20 completes charging the more than four battery assemblies 12 on the serial-connected branches, the indication element 141 corresponding to the disconnected protection unit 13 is not enabled by the voltage difference value Vab if any one of the more than four protection units 13 of the battery modules 10 is disconnected and the voltage difference value Vab of the disconnected protection unit 13 is less than the voltage setting value Vset. In other words, the voltage difference value Vab is insufficient to drive the LED to light up.

Moreover, after the charging module 20 completes charging the more than four battery assemblies 12 on the serial-connected branches, the indication element 141 corresponding to the disconnected protection unit 13 is driven by the voltage difference value Vab if any one of the more than four protection units 13 of the battery modules 10 is disconnected and the voltage difference value Vab of the disconnected protection unit 13 is greater than the voltage setting value Vset.

For example, it is assumed that a protection unit 13 on one of the at least two serial-connected branches is disconnected. Since the serial-connected branch is disconnected due to the disconnection of the protection unit 13, the charging module 20 fails to effectively charge the battery assemblies 12 on the serial-connected branch but only other non-disconnected serial-connected branches can be charged. After the charging module 20 completes charging the battery assemblies 12, the voltage value across the disconnected serial-connected branch is gradually reduced if the serial-connected branch cannot be charged by the charging module 20, and therefore the voltage value across the disconnected serial-connected branch is less than that of any one non-disconnected serial-connected branch. At this condition, if a voltage difference value between a voltage across the non-disconnected serial-connected branch and a voltage across the disconnected serial-connected branch is greater than the voltage setting value Vset, it means that at least one indication element 141 can be driven to light or blink. Similarly, if the voltage difference value between the voltage across the non-disconnected serial-connected branch and the voltage across the disconnected serial-connected branch is greater than N times the voltage setting value Vset, it means that at least N indication elements 141 can be driven to light or blink, thereby accurately indicating or rendering the operation status, and particularly to the abnormal status of the battery module 10 for the system operator or the system maintainer in the worst case scenario for the disconnection of all protection units 13.

Figure 9:
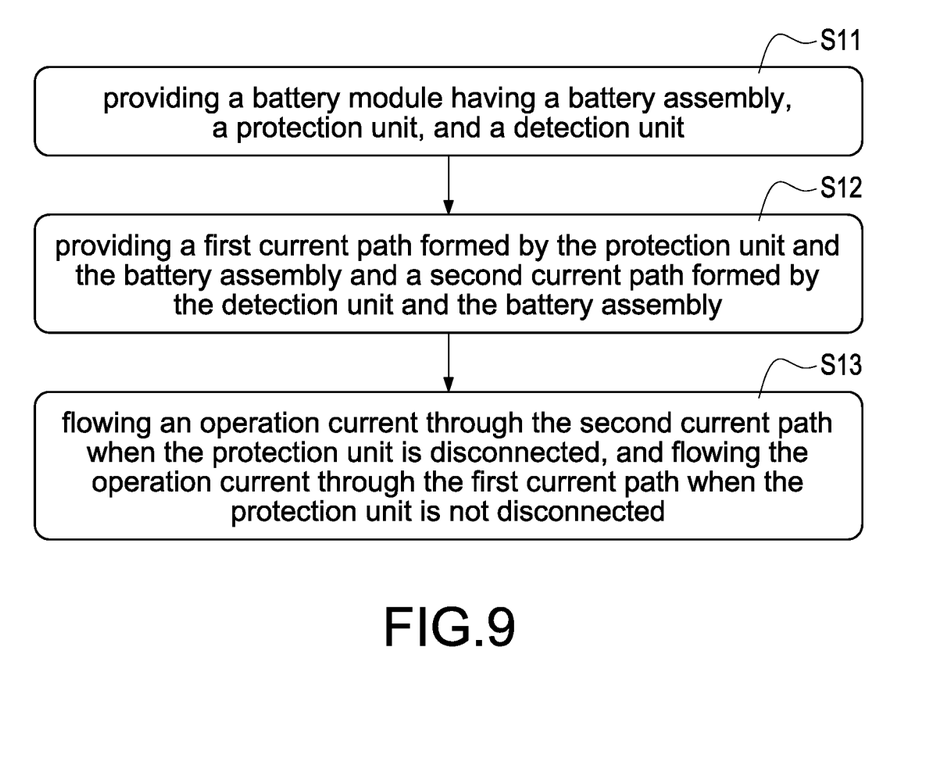
FIG. 9 is a flowchart of a method of operating a battery module with an abnormality detection function according to the present invention.

Please refer to FIG. 9, which is a flowchart of a method of operating a battery module with an abnormality detection function according to the present invention, and the method includes following steps. First, a battery module is provided, and the battery module includes a battery assembly, a protection unit, and a detection unit (S11). In particular, the protection unit may be a fuse, and the detection unit may provide the function of a light indication or a sound indication.

Afterward, a first current path and a second current path are provided. In particular, the protection unit and the battery assembly are located on the first current path; the detection unit and the battery assembly are located on the second current path (S12). Finally, when the protection unit is disconnected, an operation current flows through the second current path; when the protection is not disconnected, the operation current flows through the first current path (S13). More specifically, when an abnormal operation of the battery module occurs, the protection unit is disconnected and the operation current flows through the second current path, and therefore the operation current makes the detection unit indicate out the abnormal operation by performing the light indication or the sound indication. On the contrary, when the battery module normally operates, the protection unit is not disconnected and the operation current flows through the first current path, and therefore the operation current fails to make the detection unit work. In other words, the operation current flows through the current path which has the smallest path impedance.

In conclusion, the present invention has following features and advantages:

1. Simple circuit components installed in each battery module are used to individually protect the battery module and detect an abnormal operation of the battery module.

2. The simple protection unit, such as the fuse is cooperated with the indication element, such as the LED to provide the detection function, and the indication element is idle and there is almost no power consumption generated from the indication element under the normal operation status of the battery module.

3. The concerned information of the voltage difference value of the protection unit acquired by the battery modules can be transmitted to the external monitoring apparatus through the wired manner so that the system operator or the system maintainer can accurately and promptly replace or repair the abnormal battery module after realizing that any one of the battery modules is abnormal.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A power storage apparatus installed inside an uninterruptible power supply cabinet and uninterruptedly supplying power, the power storage apparatus comprising:
at least two battery modules with an abnormality detection function, and a serial-connected branch formed by the at least two battery modules, and each battery module comprising:
a body;
a battery assembly disposed inside the body, and the battery assembly having a plurality of battery units electrically connected to each other;
a protection unit disposed inside the body and connected in series to the battery assembly, and the protection unit having a first end and a second end; and
a detection unit disposed inside the body and connected in parallel between the first end and the second end of the protection unit, and the detection unit comprising:
an indication element having two ends respectively coupled to the first end and the second end of the protection unit, and the indication element configured to be enabled by a voltage difference value between the first end and the second end when the voltage difference value is greater than a voltage setting value; and
a charging module connected in parallel to the serial-connected branch and configured to charge the at least two battery assemblies of the at least two battery modules;
wherein,
the indication elements are not enabled if the at least two protection units are not disconnected when the charging module charges the at least two battery assemblies on the serial-connected branch;
the indication element of at least one disconnected protection unit is enabled if the at least one protection unit is disconnected so that the voltage difference value of the at least one disconnected protection unit is greater than the voltage difference value when the charging module charges the at least two battery assemblies on the serial-connected branch.

2. The power storage apparatus in claim 1, wherein the detection unit further comprises:
a current-limiting resistor connected in series to the indication element; and
a diode forward connected in series to the current-limiting resistor or the indication element.

3. The power storage apparatus in claim 1, wherein the detection unit further comprises:
a voltage-limiting resistor connected in parallel to the indication element.

4. The power storage apparatus in claim 3, wherein a resistance value of the voltage-limiting resistor is greater than a resistance value of the current-limiting resistor.

5. The power storage apparatus in claim 1, wherein the protection unit is a fuse.

6. The power storage apparatus in claim 1, wherein the indication element is a light indication element or a sound indication element.

7. The power storage apparatus in claim 1, wherein the first end and the second end of the protection unit are coupled to the body to form at least two dry contacts, and the at least two dry contacts are connected to an external monitoring apparatus; concerned information of the voltage difference value is transmitted to the external monitoring apparatus so that the external monitoring apparatus is configured to monitor an operation status of the battery module according to the concerned information of the voltage difference value.

8. The power storage apparatus in claim 1, further comprising:
a connection interface disposed inside the body and connected to two ends of a serial-connected structure formed by the battery module and the protection unit, and providing a positive terminal and a negative terminal.

9. The power storage apparatus in claim 1, wherein the charging module is an AC-to-DC converter.

10. A power storage apparatus installed inside an uninterruptible power supply cabinet and uninterruptedly supplying power, the power storage apparatus comprising:
at least four battery modules with an abnormality detection function, and at least two serial-connected branches formed by the at least four battery modules, and each battery module comprising:
a body;
a battery assembly disposed inside the body, and the battery assembly having a plurality of battery units electrically connected to each other;
a protection unit disposed inside the body and connected in series to the battery assembly, and the protection unit having a first end and a second end; and
a detection unit disposed inside the body and connected in parallel between the first end and the second end of the protection unit, and the detection unit comprising:
an indication element having two ends respectively coupled to the first end and the second end of the protection unit, and the indication element configured to be enabled by a voltage difference value between the first end and the second end when the voltage difference value is greater than a voltage setting value; and
a charging module connected in parallel to the at least two serial-connected branches and configured to charge the at least four battery assemblies of the at least four battery modules;
wherein,
the indication elements are not enabled if the at least four protection units are not disconnected when the charging module charges the at least four battery assemblies on the at least two serial-connected branches;
the indication element of at least one disconnected protection unit is enabled if the at least one protection unit is disconnected so that the voltage difference value of the at least one disconnected protection unit is greater than the voltage difference value when the charging module charges the at least four battery assemblies on the at least two serial-connected branches;
the indication element of at least one disconnected protection unit is not enabled if the at least one protection unit is disconnected so that the voltage difference value of the at least one disconnected protection unit is less than or equal to the voltage difference value after the charging module completes charging the at least four battery assemblies on the at least two serial-connected branches;

the indication element of at least one disconnected protection unit is enabled if the at least one protection unit is disconnected so that the voltage difference value of the at least one disconnected protection unit is greater than the voltage difference value after the charging module completes charging the at least four battery assemblies on the at least two serial-connected branches.

11. The power storage apparatus in claim 10, wherein the detection unit further comprises:
- a current-limiting resistor connected in series to the indication element; and
- a diode forward connected in series to the current-limiting resistor or the indication element.

12. The power storage apparatus in claim 10, wherein the detection unit further comprises:
- a voltage-limiting resistor connected in parallel to the indication element.

13. The power storage apparatus in claim 12, wherein a resistance value of the voltage-limiting resistor is greater than a resistance value of the current-limiting resistor.

14. The power storage apparatus in claim 10, wherein the protection unit is a fuse.

15. The power storage apparatus in claim 10, wherein the indication element is a light indication element or a sound indication element.

16. The power storage apparatus in claim 10, wherein the first end and the second end of the protection unit are coupled to the body to form at least two dry contacts, and the at least two dry contacts are connected to an external monitoring apparatus; concerned information of the voltage difference value is transmitted to the external monitoring apparatus so that the external monitoring apparatus is configured to monitor an operation status of the battery module according to the concerned information of the voltage difference value.

17. The power storage apparatus in claim 10, further comprising:
- a connection interface disposed inside the body and connected to two ends of a serial-connected structure formed by the battery module and the protection unit, and providing a positive terminal and a negative terminal.

18. The power storage apparatus in claim 10, wherein the charging module is an AC-to-DC converter.

* * * * *